April 17, 1951     F. E. HUTCHISON     2,549,471
GROUNDING CONTACT
Filed Oct. 8, 1948
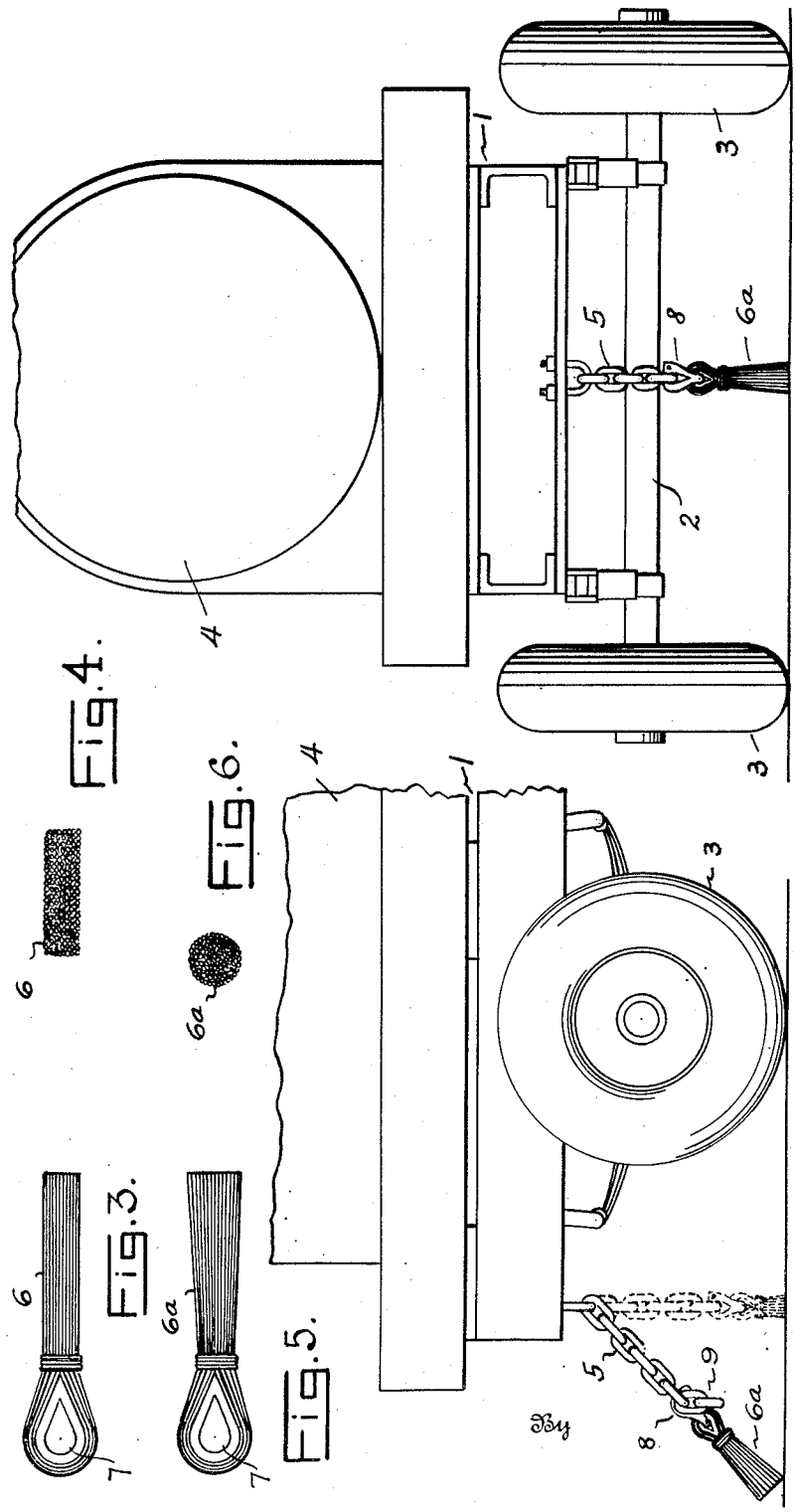
Inventor
Frank E. Hutchison
By
E. V. Hardway.
ATTORNEY.

Patented Apr. 17, 1951

2,549,471

UNITED STATES PATENT OFFICE 2,549,471

GROUNDING CONTACT

Frank E. Hutchison, Houston, Tex.

Application October 8, 1948, Serial No. 53,563

2 Claims. (Cl. 175—264)

This invention relates to a grounding contact.

The contact herein described has been specially designed for use in connection with motor vehicles used for transporting inflammable or explosive liquids particularly gasoline and similar petroleum products.

Motor vehicles used for the purpose indicated are usually mounted on wheels having rubber tires and therefore the vehicle is insulated from the ground surface.

It is a prime object of the present invention to provide a contact whereby the vehicle body will be maintained in electrical contact with the ground surface so that in case the vehicle should be electrically charged the current will be conducted to the ground surface thus shielding the vehicle; otherwise the load carried by the vehicle would be liable to become ignited thus causing an explosion.

It is a further object of the invention to provide a contact of the character described which, as it becomes worn away, may be adjusted so as to maintain the surface contact.

It is common practice to connect an ordinary metal chain to the vehicle and allow the free end of the chain to contact with the ground surface but in moving over paved streets or highways this type of contact is disagreeably noisy and it is a further object of the present invention to provide a noiseless contact.

Other objects and advantages will be apparent from the following specification which is illustrated by the accompanying drawings, wherein—

Figure 1 is a fragmentary, side view of a vehicle wherein the contact is illustrated.

Figure 2 is a rear elevation thereof.

Figure 3 is an edge view of one form of the contact.

Figure 4 is an end view thereof.

Figure 5 is a side elevation of another embodiment of the contact, and

Figure 6 is an end view thereof.

Referring more particularly to the drawings the numeral 1 designates, as a whole, a vehicle framework which is supported on the axle 2 of the vehicle.

This axle is supported by ground wheels having rubber tires 3. These tires insulate the vehicle framework from the ground surface.

The vehicle carries a tank 4, usually formed of metal, and this tank contains gasoline or other inflammable or explosive liquid.

Without the ground contact herein described should the tank or vehicle framework come into contact with an electrical conductor or should it be struck by lightning the electrical current would not be diverted but would be liable to cause ignition of the tank contents and a consequent fire and explosion.

To divert the electrical current a metal chain 5 has been connected to, and depends from, the rear tank, or other selected part, of the vehicle framework and connected to this chain there is a metallic brush, as 6 or 6a. These brushes differ only in shape and either selected form may be used.

It is, of course, obvious that any other type of conductor between the brushes and the vehicle body may be used instead of the chain.

This brush contacts with the ground surface and as the vehicle moves along paving the brush will contact with the paving and form an electrical contact with the earth surface but will be substantially noiseless.

The brush is formed, at one end, with an eye 7 of conducting material and which carries a releasable snap 8 whereby it may be attached to a selected link of the chain so that the brush will contact with the ground surface.

The chain should carry one or more extra links 9 so that as the brush wears away and its length is shortened the snap may be disengaged from the chain and engaged with a link nearer the lower end of the chain to the end that the brush will remain in contact with the ground surface until it is completely worn away.

A safe electrical contact with the ground surface is thus provided which is noiseless in use.

The drawings and description disclose what is now considered to be a preferred form of the invention by way of illustration only while the broad principle of the invention will be defined by the appended claims.

What I claim is:

1. The combination with a motor vehicle having a metallic framework and mounted to move on rubber tired wheels which insulate the framework from the ground surface, of a flexible connector connected at one end to the framework, a flexible contact device including an eye attached to the free end of the connector and a brush formed of strands looped about the eye and of a length to contact the ground surface, said contact device being adjustable along the connector to take up for wear, said connector and contact device being formed of material which will conduct electricity.

2. The combination with a motor vehicle having a metallic framework and mounted to move on rubber tired wheels which insulate the framework from the ground surface, of a chain forming a flexible connector connected at one end to the framework, a brush forming a flexible contact device attached to the free end of the connector and of a length to contact the ground surface, said brush being formed at one end with an eye and a plurality of strands looped about said eye, and said contact device being provided with a releasable snap whereby it may be attached to a selected link of the chain so that the brush will contact the ground, said connector and contact device being formed of material which will conduct electricity.

FRANK E. HUTCHISON.

REFERENCES CITED

The following references are of record in the file of this patent:

UNITED STATES PATENTS

| Number | Name | Date |
|---|---|---|
| 1,394,211 | Morgan | Oct. 18, 1921 |
| 1,709,779 | Crothers | Apr. 16, 1929 |
| 1,999,414 | King | Apr. 30, 1935 |
| 2,084,523 | Crawford | June 22, 1937 |
| 2,164,076 | Osgood | June 27, 1939 |

FOREIGN PATENTS

| Number | Country | Date |
|---|---|---|
| 746,925 | France | June 8, 1933 |